UNITED STATES PATENT OFFICE.

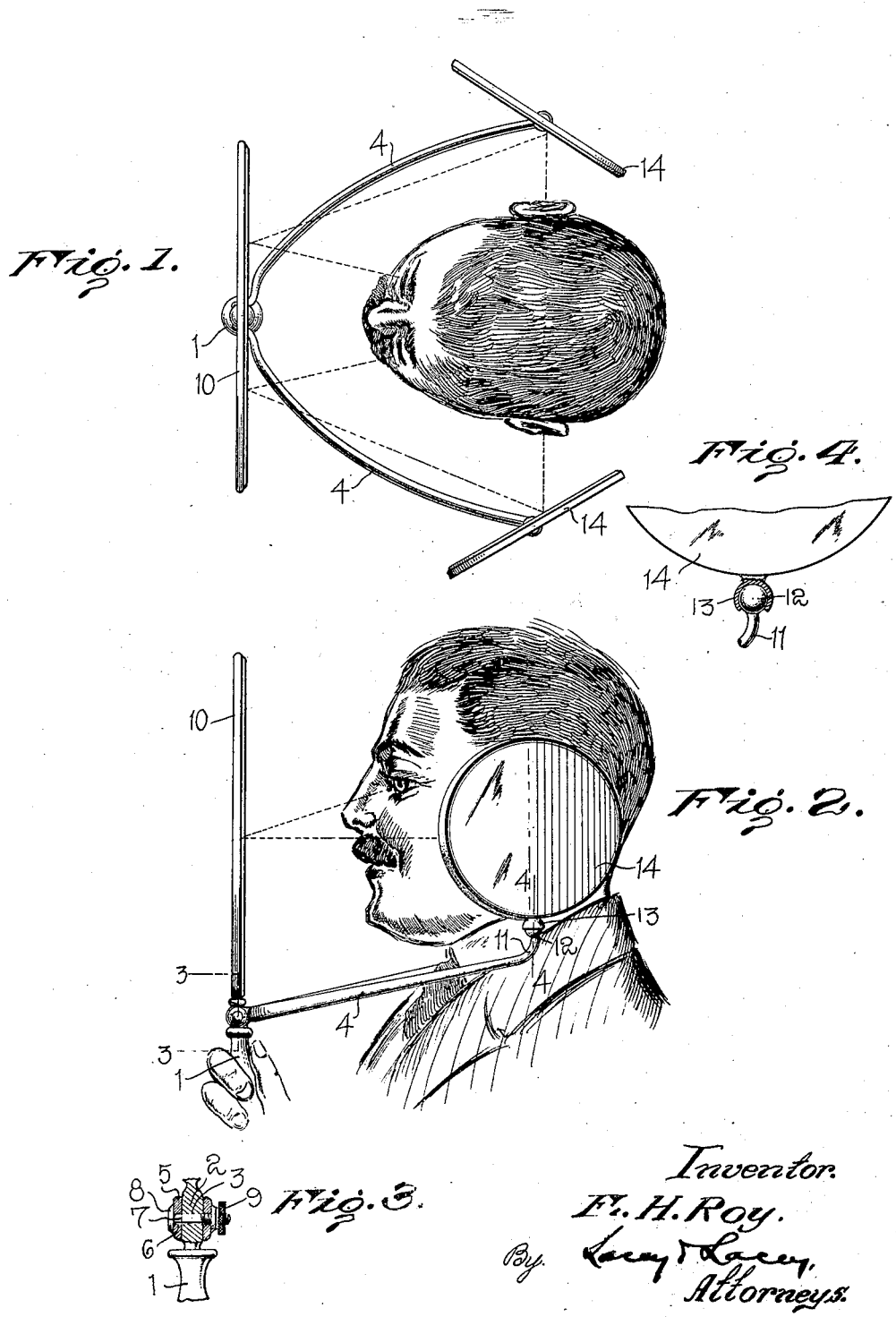
E. H. ROY.
EAR HAND MIRROR.
APPLICATION FILED MAY 7, 1919.
1,342,350.
Patented June 1, 1920.
Inventor.
E. H. Roy.
By Lacey & Lacey,
Attorneys.

EDWARD H. ROY, OF NASHVILLE, TENNESSEE.

EAR HAND-MIRROR.

1,342,350.   Specification of Letters Patent.   Patented June 1, 1920.

Application filed May 7, 1919. Serial No. 295,426.

*To all whom it may concern:*

Be it known that I, EDWARD H. ROY, a citizen of the United States, residing at Nashville, in the county of Davidson and State of Tennessee, have invented certain new and useful Improvements in Ear Hand-Mirrors, of which the following is a specification.

This invention relates to hand mirrors and has as its primary object to provide a mirror by the use of which one may view one's ears and the sides of one's head without inconvenience and without the necessity of turning the head to an uncomfortable position or of straining one's eyes.

Another object of the invention is to provide a mirror for the purpose stated by the use of which one may simultaneously view both ears or both sides of the head and which mirror will be capable of adjustment of its parts so that the device as a whole may be used with the best results.

In the accompanying drawing:

Figure 1 is a top plan view of the device illustrating the manner in which the same is to be used;

Fig. 2 is a side elevation of the device illustrating its use;

Fig. 3 is a vertical sectional view taken substantially on the line 3—3 of Fig. 2;

Fig. 4 is a similar view taken substantially on the line 4—4 of Fig. 2.

In its broadest aspect the device embodying the present invention comprises three mirrors and a novel means for supporting the same in such position that the desired results may be obtained. The support for the mirrors comprises preferably an intermediate member and side members, and the intermediate member is in the nature of a handle 1 which may be conveniently grasped in either hand for the purpose of holding the device in position for use, this handle being provided at its upper end preferably with a flat sided ear 2 formed with a pivot opening 3. The arms above referred to are indicated by the numeral 4 and each arm is formed at its forward end with a pivot ear 5 having a pivot opening 6, the arms being disposed at opposite sides of the intermediate or handle member with their ears 5 seating against the opposite flat faces of the ear 2 of the said handle member, and a pivot pin or bolt 7 is fitted through the openings 3 and 6 in the manner clearly shown in Fig. 3 of the drawings and is provided at one end with a head 8 which bears against one of the said ears 5. A milled nut 9 is threaded onto the other end of the bolt and may be tightened to bear against the other ear 5 so that when this bolt is tightened the said ears will be firmly bound against the ear 2 and thus the arms 4 will be maintained in the positions to which they may have been adjusted. The pivot pin or bolt 7 extends transversely through the upper end of the handle member and consequently the arms 4 are adapted to be swung upwardly or downwardly upon the pivot pin or bolt 7. These arms 4 are preferably bowed to extend outwardly and rearwardly in opposite directions from the intermediate or handle member 1, as clearly shown in Fig. 1 of the drawings, so that the arms will be suitably spaced from the neck and shoulders of the user of the device when the device is in use.

At its upper end, the handle member 1 supports a mirror 10 of any desired size and shape, this mirror occupying preferably a vertical plane with the pivot pin 7 and being consequently so arranged as to be positioned directly facing the user of the device when the device is held in the manner shown in Figs. 1 and 2 of the drawings or, in other words, with the arms 4 extending at opposite sides of the head or neck of the user.

Each arm 4 has its rear end portion bent to extend upwardly, as indicated by the numeral 11, and is formed at its extremity with a ball 12 which fits frictionally within a socket 13 at the lower side of a mirror 14. The ball and socket provide substantially a universal joint between the mirrors 14 and the respective arms 4 so that these mirrors may be adjusted rotatably about a vertical axis passing through the ball 12 and they may be adjusted to assume various angles of inclination if desired. When the parts are adjusted approximately as shown in Figs. 1 and 2 of the drawings, an excellent view of the opposite sides of one's head and of the interior of one's ears may be had by looking into the mirror 10, but under some conditions it may be found desirable to adjust the arms 4 upon their pivot 7 and at times to adjust the mirrors 4 upon their universal joints. Of course, sacrificing the advantages of the adjustments described, the arms 4 may be rigidly or integrally connected with the handle member 1 and the mirrors 14 may be rigidly connected at a predetermined angle with their respective arms 4. However, in many cases these adjustments will be found of great benefit and they present the additional advantage that by swinging the arms 4 downwardly upon the pivot 7 so that they lie within the plane of the handle 1 and by turning the mirrors 14 down upon their joints so that they will lie face down with relation to their respective arms 4, the entire devices may be reduced to relatively flat form and thus conveniently packed in a case while not in use or when it is desired to ship the same.

It will be evident that the side mirrors may be so adjusted with relation to the main mirror that one using the device may, so to speak, look directly into one's ears.

Having thus described the invention, what is claimed as new is:

1. A device for inspecting one's ears including a handle, a mirror connected to the upper end of said handle, the upper end portion of said handle being flattened on opposite sides and apertured, a pair of arms arranged on opposite sides of said handle and having their forward end portions provided with flat apertured ears flatly in contact with the flattened sides of said handle, a pivot bolt passing through said ears and the apertures of the said handle, and mirrors adjustably carried by the rear ends of said arms, said arms being bowed whereby the second named mirrors may be positioned close to the ears.

2. A device for inspecting one's ears including a handle, a mirror rigidly connected to the upper end of said handle, a pair of arms horizontally pivoted at their forward end portions to said handle, the rear end portions of said arms being extended upwardly and terminating in ball heads, and a pair of mirrors having their lower edges provided with sockets receiving the ball heads of said arms whereby said second named mirrors are mounted for universal adjustment, said arms being curved longitudinally whereby said second named mirrors may be positioned relatively close to the ears.

In testimony whereof I affix my signature.

EDWARD H. ROY. [L. S.]